US012772224B2

(12) United States Patent
Hou et al.

(10) Patent No.: US 12,772,224 B2
(45) Date of Patent: Oct. 20, 2026

(54) COMMUNICATION METHOD AND APPARATUS FOR RANDOM ACCESS PROCEDURE

(71) Applicant: HUAWEI TECHNOLOGIES CO., LTD., Shenzhen (CN)

(72) Inventors: Hailong Hou, Beijing (CN); Zhe Jin, Beijing (CN); Zhihu Luo, Beijing (CN); Weilin Qu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 18/492,805

(22) Filed: Oct. 24, 2023

(65) Prior Publication Data

US 2024/0064722 A1 Feb. 22, 2024

Related U.S. Application Data

(63) Continuation of application No. PCT/CN2022/087666, filed on Apr. 19, 2022.

(30) Foreign Application Priority Data

May 10, 2021 (CN) ......................... 202110506605.8

(51) Int. Cl.
*H04W 72/0453* (2023.01)
*H04W 72/1268* (2023.01)

(52) U.S. Cl.
CPC ... *H04W 72/0453* (2013.01); *H04W 72/1268* (2013.01)

(58) Field of Classification Search
CPC ......... H04W 72/0453; H04W 72/1268; H04W 72/04; H04W 72/23; H04W 72/51; H04W 74/0833; H04W 74/006; H04W 72/0457; H04W 72/121; H04L 5/00; H04L 5/001; H04L 5/0053; H04L 5/0094
See application file for complete search history.

(56) References Cited

U.S. PATENT DOCUMENTS

2018/0192439 A1* 7/2018 Tang ..................... H04W 74/04
2019/0306861 A1* 10/2019 Li ......................... H04W 72/23
(Continued)

OTHER PUBLICATIONS

Spreadtrum Communications:"Discussion on aspects related to reduced maximum UE bandwidth." 3GPP TSG RAN WG1 #104b-e R1-2102460 e-Meeting, Apr. 12 20, 2021. total 9 pages.
(Continued)

*Primary Examiner* — Kiet Tang

(57) ABSTRACT

A communication method and apparatus. The method includes: sending configuration information of a first initial uplink bandwidth part (BWP) to a first terminal device of a first type, and sending configuration information of a second initial uplink BWP to a second terminal device of a second type; and sending first information to at least one of the first terminal device or the second terminal device, where a first frequency domain resource indicated by the first information is in a frequency domain range of the first initial uplink BWP and is used for sending a third message (Msg3); and a second frequency domain resource indicated by the first information is in a frequency domain range of the second initial uplink BWP and used for sending a Msg3.

14 Claims, 5 Drawing Sheets

(56) References Cited

U.S. PATENT DOCUMENTS

| | | | | |
|---|---|---|---|---|
| 2020/0280984 | A1* | 9/2020 | Yi | H04L 5/0094 |
| 2021/0076384 | A1 | 3/2021 | Molavianjazi et al. | |
| 2021/0377812 | A1* | 12/2021 | Zhou | H04W 72/23 |
| 2021/0410122 | A1* | 12/2021 | Ma | H04L 5/005 |
| 2022/0264589 | A1* | 8/2022 | Sun | H04W 4/70 |
| 2022/0264673 | A1* | 8/2022 | Zhao | H04W 72/0453 |

OTHER PUBLICATIONS

Futurewei: "Bandwidth reduction for RedCap UEs." 3GPP TSG RAN WG1#104b-e R1-2102778 e-Meeting, Apr. 12 20, 2021. total 10 pages.

MCC Support: ""Draft Report of 3GPP TSG RAN WG1 #104-e v0.3.0" R1-210xxxx" , 3GPP TSG RAN WG1 Meeting #104BIS-E, 3rd Generation Partnership Project (3GPP), Mobilecompetence Centre; 650, Route Des Lucioles; F-06921 Sophia-Antipolis Cedex; France, Apr. 20, 2021 (Apr. 20, 2021), pp. 1-179, XP009549915.

* cited by examiner

COMMUNICATION METHOD AND APPARATUS FOR RANDOM ACCESS PROCEDURE

CROSS-REFERENCE TO RELATED APPLICATIONS

This application is a continuation of International Application No. PCT/CN2022/087666, filed on Apr. 19, 2022, which claims priority to Chinese Patent Application No. 202110506605.8, filed on May 10, 2021. The disclosures of the aforementioned applications are hereby incorporated by reference in their entireties.

TECHNICAL FIELD

This application relates to the field of communication technologies, and in particular, to a communication method and apparatus.

BACKGROUND

In an initial access phase, a network device configures a common bandwidth part (bandwidth part, BWP) of a cell. The bandwidth part includes an initial downlink BWP (initial DL BWP) and an initial uplink BWP (initial UL BWP). Some uplink channel transmission parameters in a random access procedure are configured in the initial uplink BWP. For example, in the random access procedure, transmission of a third message (Msg3) is performed in the initial uplink BWP. The network device may schedule some uplink channels in the random access procedure by using a random access response uplink grant (RAR UL grant).

A maximum bandwidth of an initial uplink BWP cannot exceed a maximum bandwidth supported by a terminal device, and a frequency domain range of an initial uplink BWP of a legacy (legacy) terminal device is different from a frequency domain range of an initial uplink BWP of a terminal device whose capability is lower than that of the legacy terminal device. Therefore, when the network device does not determine a type of the terminal device, a transmission error is likely to occur when the network device schedules some uplink channels in the random access procedure.

SUMMARY

This application provides a communication method and apparatus, to resolve a problem that when a network device does not determine or does not obtain a type of a terminal device, a transmission error occurs when the network device schedules some uplink channels in a random access procedure.

According to a first aspect, this application provides a communication method. The method may be performed by a network device, or may be performed by a chip or a circuit. The method includes: sending configuration information of a first initial uplink BWP to a first terminal device, and sending configuration information of a second initial uplink BWP to a second terminal device, where the first terminal device is a first-type terminal device, and the second terminal device is a second-type terminal device; and sending first information to the first terminal device, and/or sending the first information to the second terminal device, where a first frequency domain resource indicated by the first information is in a frequency domain range of the first initial uplink BWP, and the first frequency domain resource is used by the first terminal device to send a Msg3; and a second frequency domain resource indicated by the first information is in a frequency domain range of the second initial uplink BWP, and the second frequency domain resource is used by the second terminal device to send a Msg3.

In this embodiment of this application, when scheduling the Msg3, the network device may send same scheduling information (namely, the first information) for two types of terminal devices. The scheduling information may indicate the first terminal device to perform transmission of the Msg3 in a range of an initial uplink BWP (namely, the first initial uplink BWP) of the first terminal device, and the scheduling information may indicate the second terminal device to perform transmission of the Msg3 in a range of an initial uplink BWP (namely, the second initial uplink BWP) of the second terminal device. In the foregoing manner, when the network device does not determine a type of the terminal device, the network device may schedule, by using a same indication value, terminal devices in ranges of different BWPs to perform transmission of the Msg3, to avoid a transmission error caused because a scheduling resource of the Msg3 is not in the range of the initial uplink BWP of the terminal device.

In a possible design, the first information is a resource indication value (RIV). The resource indication value is a resource indication value of a frequency domain resource. According to the foregoing design, the network device may indicate a same RIV for the two types of terminal devices.

In a possible design, after the first information is sent to the first terminal device, the Msg3 from the first terminal device is received on the first frequency domain resource; and/or after the first information is sent to the second terminal device, the Msg3 from the second terminal device is received on the second frequency domain resource. According to the foregoing design, the network device may indicate, by using same information (the first information), frequency domain resources of the two terminal devices in ranges of respective initial uplink BWPs, so that the terminal devices may send the Msg3 on the corresponding frequency domain resources, to improve a success rate of transmission of the Msg3.

In a possible design, for the second terminal device, the first information is determined based on a start location and a length of the second frequency domain resource and the first initial uplink BWP. According to the foregoing design, the network device may determine the first information for both the first terminal device and the second terminal device based on the first initial uplink BWP, so that complexity may be reduced. In this case, when the type of the terminal device is not determined, the network device may determine, according to a same rule, frequency domain resource allocation information for transmission of the Msg3, so that a transmission error that may occur may be resolved.

In a possible design, for the first terminal device, the first information is determined based on a start location and a length of the first frequency domain resource and the second initial uplink BWP. According to the foregoing design, the network device may determine the first information for both the first terminal device and the second terminal device based on the second initial uplink BWP, so that complexity may be reduced. In this case, when the type of the terminal device is not determined, the network device may determine, according to a same rule, frequency domain resource allocation information for transmission of the Msg3, so that a transmission error that may occur may be resolved.

In a possible design, for the first terminal device, the first information is determined based on a start location and a length of the first frequency domain resource and the first initial uplink BWP. For the second terminal device, the first information is determined based on a start location and a length of the second frequency domain resource and the second initial uplink BWP. According to the foregoing design, a small change may be made to the protocol, so that compatibility of the terminal device may be improved.

In a possible design, a frequency domain range of the first frequency domain resource is the same as a frequency domain range of the second frequency domain resource. In other words, an absolute frequency domain location of the first frequency domain resource is the same as an absolute frequency domain location of the second frequency domain resource, and the length of the first frequency domain resource is the same as the length of the second frequency domain resource. According to the foregoing design, the first terminal device and the second terminal device may determine, based on the same information (the first information), a same frequency domain resource to send the Msg3.

In a possible design, the start location of the first frequency domain resource is the same as the start location of the second frequency domain resource, and a start location of the first initial uplink BWP is the same as a start location of the second initial uplink BWP. The start location of the first frequency domain resource is a relative frequency domain location of the first frequency domain resource in the first initial uplink BWP, and the start location of the second frequency domain resource is a relative frequency domain location of the second frequency domain resource in the second initial uplink BWP.

According to the foregoing design, the start location of the first frequency domain resource is the same as the start location of the second frequency domain resource, to be specific, the relative frequency domain location of the first frequency domain resource in the first initial uplink BWP is the same as the relative frequency domain location of the second frequency domain resource in the second initial uplink BWP, and the start location of the first initial uplink BWP is the same as the start location of the second initial uplink BWP, so that the absolute frequency domain location of the first frequency domain resource is the same as the absolute frequency domain location of the second frequency domain resource.

In a possible design, the start location of the first frequency domain resource is the same as the start location of the second frequency domain resource. The start location of the first frequency domain resource is a relative frequency domain location of the first frequency domain resource in the first initial uplink BWP, and the start location of the second frequency domain resource is a relative frequency domain location of the second frequency domain resource in the first initial uplink BWP.

In a possible design, the start location of the first frequency domain resource is the same as the start location of the second frequency domain resource. The start location of the first frequency domain resource is a relative frequency domain location of the first frequency domain resource in the first initial uplink BWP, the start location of the second frequency domain resource is determined based on a relative frequency domain location of the second frequency domain resource in the second initial uplink BWP and a first offset value, and the first offset value is a frequency domain offset value between the start location of the first initial uplink BWP and the start location of the second initial uplink BWP.

According to the foregoing design, the start location of the first frequency domain resource is the same as the start location of the second frequency domain resource, to be specific, the relative frequency domain location of the first frequency domain resource in the first initial uplink BWP is the same as the relative frequency domain location of the second frequency domain resource in the second initial uplink BWP. In addition, when the start location of the first initial uplink BWP is not aligned with the start location of the second initial uplink BWP, the absolute frequency domain location of the first frequency domain resource may be the same as the absolute frequency domain location of the second frequency domain resource based on the frequency domain offset value between the start location of the second initial uplink BWP and the start location of the first initial uplink BWP.

In a possible design, the frequency domain range of the first frequency domain resource is different from the frequency domain range of the second frequency domain resource. According to the foregoing design, the first terminal device and the second terminal device may determine, based on the same information (the first information), the frequency domain resources in the ranges of the respective initial uplink BWPs to send the Msg3.

In a possible design, the first frequency domain resource and/or the second frequency domain resource belong/belongs to a first frequency domain resource set, and a RIV of any frequency domain resource in the first frequency domain resource set for the first terminal device is the same as a RIV of any frequency domain resource for the second terminal device. In the foregoing design, the network device allocates the frequency domain resources of the Msg3 to the first terminal device and the second terminal device in the first frequency domain resource set, so that the network device may separately indicate the frequency domain resources of the two terminal devices by using the same information (the first information).

In a possible design, the first frequency domain resource and the second frequency domain resource belong to a first frequency domain resource subset in a second frequency domain resource set, at least one frequency domain resource subset in the second frequency domain resource set includes at least one first-type frequency domain resource and at least one second-type frequency domain resource, and in a same frequency domain resource subset, a RIV of the first-type frequency domain resource for the first terminal device is the same as a RIV of the second-type frequency domain resource for the second terminal device. In the foregoing design, the network device allocates the frequency domain resources of the Msg3 to the first terminal device and the second terminal device in the second frequency domain resource set, so that the network device may separately indicate the frequency domain resources of the two terminal devices by using the same information (the first information).

In a possible design, the first information is carried in a random access response uplink grant (RAR UL grant) or downlink control information (DCI) scrambled by using a temporary cell radio network temporary identifier (TC-RNTI). In a specific design, the first information is carried in a frequency domain resource allocation field in the RAR UL grant or a frequency domain resource allocation field in the DCI scrambled by using the TC-RNTI.

According to a second aspect, this application provides a communication method. The method may be performed by a terminal device, or may be performed by a chip or a circuit. The method includes: receiving first information from a network device, where the first information indicates a first frequency domain resource for sending a third message (Msg3) in a random access procedure; and determining the first frequency domain resource based on the first information and a second initial uplink BWP, where the first frequency domain resource is in a frequency domain range of a first initial uplink BWP, the first initial uplink BWP is an initial uplink BWP of a first terminal device, and the second initial uplink BWP is an initial uplink BWP of a second terminal device.

According to the solution provided in this embodiment of this application, both the first terminal device and the second terminal device may determine the first information based on the first initial uplink BWP, or both the first terminal device and the second terminal device may determine the first information based on the second initial uplink BWP. Correspondingly, the network device may determine the first information based on the first initial uplink BWP (or the second initial uplink BWP) for both the first terminal device and the second terminal device, so that complexity may be reduced. In this case, when the network device does not determine a type of the terminal device, the network device may determine, according to a same rule, frequency domain resource allocation information for transmission of the Msg3, so that a transmission error that may occur may be resolved.

In a possible design, the first frequency domain resource is in a frequency domain range of the second initial uplink BWP. According to the foregoing design, the first terminal device and the second terminal device may determine, based on same information (the first information), a same frequency domain resource to send the Msg3.

In a possible design, the determining the first frequency domain resource based on the first information and a second initial uplink BWP includes: determining a start location of the first frequency domain resource and a length of the first frequency domain resource based on the first information and a size of the second initial uplink BWP. According to the foregoing design, the terminal device may determine resource allocation information of a second frequency domain resource based on the first initial uplink BWP.

In a possible design, the determining the first frequency domain resource based on the first information and a second initial uplink BWP includes: determining a start location of the first frequency domain resource and a length of the first frequency domain resource based on the first information, the first initial uplink BWP, and a first offset value, where the first offset value is a frequency domain offset value between a start location of the first initial uplink BWP and a start location of the second initial uplink BWP. According to the foregoing design, the terminal device may determine resource allocation information of a second frequency domain resource based on the frequency domain offset value between the start location of the second initial uplink BWP and the start location of the first initial uplink BWP.

In a possible design, the first information is carried in a RAR UL grant or DCI scrambled by using a TC-RNTI.

According to a third aspect, this application further provides a communication apparatus. The communication apparatus implements any method according to the first aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a network device.

In a possible implementation, the communication apparatus includes corresponding functional modules, respectively configured to implement the steps in the foregoing method. The function may be implemented by hardware, or may be implemented by hardware executing corresponding software. The hardware or the software includes one or more modules corresponding to the foregoing function.

In a possible implementation, a structure of the communication apparatus includes a processing unit and a communication unit. These units may perform corresponding functions in the foregoing method examples. For details, refer to the descriptions in the method according to the first aspect. Details are not described herein.

According to a fourth aspect, this application further provides a communication apparatus. The communication apparatus implements any method according to the second aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a network device.

In a possible implementation, the communication apparatus includes corresponding functional modules, respectively configured to implement the steps in the foregoing method. The function may be implemented by hardware, or may be implemented by hardware executing corresponding software. The hardware or the software includes one or more modules corresponding to the foregoing function.

In a possible implementation, a structure of the communication apparatus includes a processing unit and a communication unit. These units may perform corresponding functions in the foregoing method examples. For details, refer to the descriptions in the method according to the second aspect. Details are not described herein.

According to a fifth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to any one of the first aspect and the possible designs of the first aspect through a logic circuit or by executing code instructions.

According to a sixth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to any one of the second aspect and the possible designs of the second aspect through a logic circuit or by executing code instructions.

According to a seventh aspect, a computer-readable storage medium is provided. The computer-readable storage medium stores a computer program or instructions. When the computer program or the instructions are executed by a processor, the method according to any one of the first aspect and the possible designs of the first aspect is implemented.

According to an eighth aspect, a computer program product storing instructions is provided. When the instructions are run by a processor, the method according to any one of the first aspect and the possible designs of the first aspect is implemented.

According to a ninth aspect, a chip system is provided. The chip system includes a processor, and may further include a memory, configured to implement the method according to any one of the first aspect and the possible designs of the first aspect. The chip system may include a chip, or may include a chip and another discrete component.

According to a tenth aspect, a communication system is provided. The system includes the apparatus (for example, the network device) according to the first aspect and the apparatus (for example, the terminal device) according to the second aspect.

DESCRIPTION OF EMBODIMENTS

Figure 1:
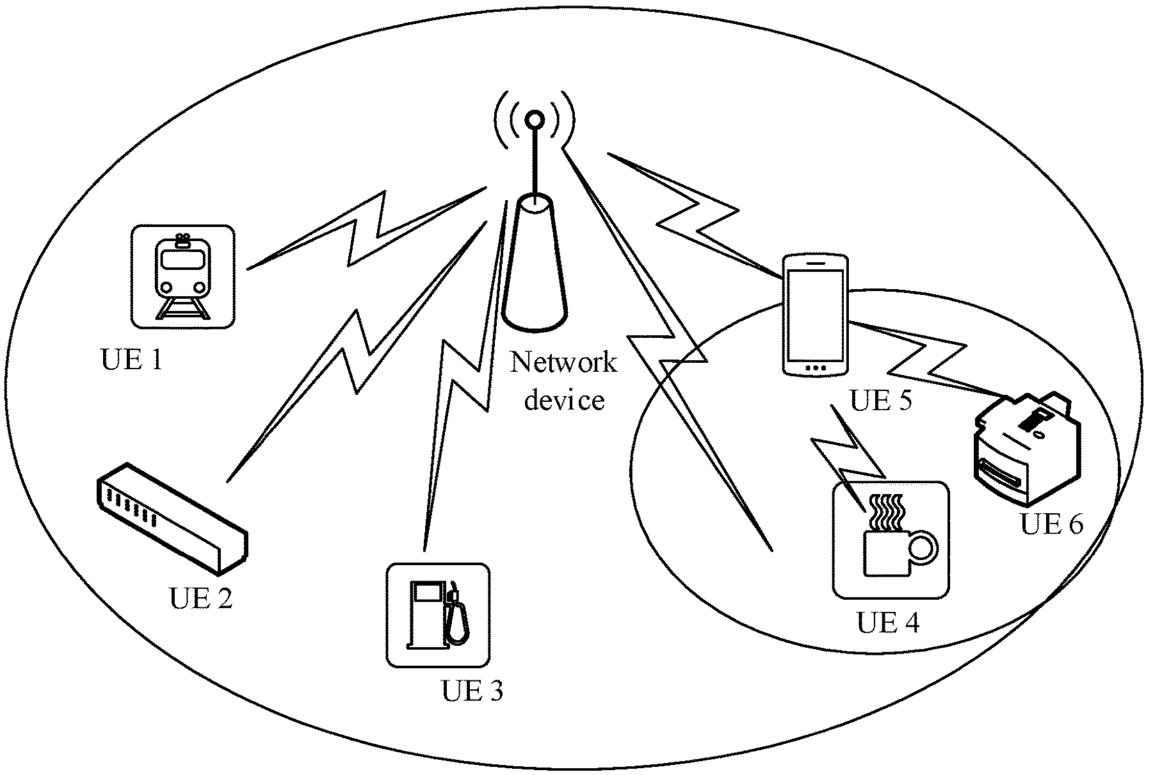
FIG. 1 is a schematic diagram of an architecture of a network system according to an embodiment of this application.

To make objectives, technical solutions, and advantages of embodiments of this application clearer, the following further describes embodiments of this application in detail with reference to the accompanying drawings.

In the following, some terms in embodiments of this application are explained and described to facilitate understanding of a person skilled in the art.

(1) A terminal device may be a device having a wireless transceiver function or a chip that can be disposed in any device, or may be referred to as user equipment (user equipment, UE), an access terminal, a subscriber unit, a subscriber station, a mobile station, a remote station, a remote terminal, a mobile device, a user terminal, a wireless communication device, a user agent, or a user apparatus. The terminal device in embodiments of this application may be a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in video surveillance, a wearable terminal device, or the like.

A network device may be an apparatus configured to implement a function of an access network device. The access network device may be a device that communicates with a wireless terminal device over an air interface in an access network through one or more cells. For example, the access network device may be a next generation NodeB (next Generation NodeB, gNB) in an NR system, an evolved NodeB (evolved NodeB, eNB) in an LTE system, or the like. Alternatively, the network device may be an apparatus that can support the network device in implementing a function of the access network device, for example, a chip system. The apparatus may be installed in the network device.

(2) The terminal device in embodiments of this application may be a first-type terminal device, a second-type terminal device, or another terminal device that needs to perform transmission performance enhancement, for example, an NR enhanced mobile broadband (Enhanced Mobile Broadband, eMBB) terminal device. A difference between the first-type terminal device and the second-type terminal device includes at least one of the following:

1. Bandwidth capabilities are different. A maximum bandwidth supported by the first-type terminal device may be greater than a maximum bandwidth supported by the second-type terminal device. For example, the first-type terminal device may support a maximum of 100 MHz frequency domain resources on one carrier to communicate with the network device, and the second-type terminal device may support a maximum of 20 MHz, 10 MHz, or 5 MHz frequency domain resources on one carrier to communicate with the network device.

2. Quantities of transceiver antennas are different. An antenna configuration of the first-type terminal device may be greater than an antenna configuration of the second-type terminal device. For example, a minimum antenna configuration supported by the first-type terminal device may be greater than a maximum antenna configuration supported by the second-type terminal device.

3. Maximum uplink transmitting power is different. Maximum uplink transmitting power of the first-type terminal device may be greater than maximum uplink transmitting power of the second-type terminal device.

4. The first-type terminal device and the second-type terminal device correspond to different protocol versions. For example, NR Rel-15 and NR Rel-16 terminal devices may be considered as first-type terminal devices, and the second-type terminal device may be considered as an NR Rel-17 terminal device.

5. The first-type terminal device and the second-type terminal device support different carrier aggregation (carrier aggregation, CA) capabilities. For example, the first-type terminal device may support carrier aggregation, but the second-type terminal device does not support carrier aggregation. For another example, both the second-type terminal device and the first-type terminal device support carrier aggregation, but a maximum quantity of carriers that can be simultaneously aggregated by the first-type terminal device is greater than a maximum quantity of carriers that can be simultaneously aggregated by the second-type terminal device.

6. Frequency division duplex (frequency division duplex, FDD) capabilities of the first-type terminal device and the second-type terminal device are different. For example, the first-type terminal device may support full-duplex FDD, and the second-type terminal device may support only half-duplex FDD.

7. The second-type terminal device and the first-type terminal device have different data processing time capabilities. For example, a minimum delay between receiving downlink data and sending a feedback on the downlink data by the first-type terminal device is less than a minimum delay between receiving downlink data and sending a feedback on the downlink data by the second-type terminal device.

8. The first-type terminal device and the second-type terminal device correspond to different uplink and/or downlink peak transmission rates.

(3) A resource indication value (resource indication value, RIV) is a field used to allocate a transmission resource. For example, for a Msg3, transmission of the Msg3 is performed through a PUSCH, and initial transmission scheduling information of the Msg3 is indicated by a random access response (random access response, RAR) uplink scheduling grant (uplink grant, UL grant) carried in a second message (Msg2), where the RAR UL grant may be a RAR grant for short. The RAR grant includes a physical uplink shared channel (physical uplink shared channel, PUSCH) frequency domain resource indication (PUSCH frequency resource allocation) field, and the PUSCH frequency resource allocation field may indicate frequency domain resource allocation of the Msg3. The PUSCH frequency resource allocation field may include a RIV corresponding to a start resource and a length of consecutively allocated resource blocks. In this application, the length of the resource blocks may be a quantity of resource units.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

In addition, unless otherwise stated, ordinal numbers such as "first" and "second" in embodiments of this application are used to distinguish between a plurality of objects, but are not intended to limit sizes, content, an order, a time sequence, priorities, importance degrees, or the like of the plurality of objects. For example, a first frequency domain resource and a second frequency domain resource are merely used to distinguish between different frequency domain resources, but do not indicate different sizes, locations, priorities, importance degrees, or the like of the two frequency domain resources.

The foregoing describes some terms in embodiments of this application. The following describes technical features in embodiments of this application.

A random access procedure includes a 4-step random access channel (random access channel, RACH) and a 2-step RACH. In the 4-step RACH, after receiving a random access preamble (random access preamble) sent by the terminal device, the network device sends a random access response (random access response, RAR) to the terminal device. The random access response (random access response, RAR) includes information such as uplink resource allocation information. The terminal device sends a third message (Msg3) in the random access procedure based on scheduling of a RAR message, where the Msg3 is used to send an RRC connection setup request. In the 2-step RACH, the terminal device sends a message A (MsgA) to the network device. The MsgA includes two parts: one part is a preamble, and the other part is a PUSCH payload (payload). It may be considered that the MsgA message includes the preamble and content included in the Msg3 in the 4-step RACH.

Currently, in an initial access phase, the network device configures a common BWP of a cell for the terminal device to perform random access. The BWP includes an initial downlink BWP (initial DL BWP) and an initial uplink BWP (initial UL BWP). Some uplink channel transmission parameters in the random access procedure are configured in the initial uplink BWP. The parameters include a physical random access channel (physical random access channel, PRACH) resource of a first message (Msg1), a physical uplink shared channel (physical uplink shared channel, PUSCH) resource of the Msg3, a common PUCCH resource used for a hybrid automatic repeat request (hybrid automatic repeat request, HARQ)—acknowledgment (acknowledgment, ACK) feedback of a fourth message (Msg4), and the like.

A maximum bandwidth of the initial uplink BWP cannot exceed a maximum bandwidth supported by the terminal device, and a frequency domain range of the initial uplink BWP of the first-type terminal device is different from a frequency domain range of the initial uplink BWP of the second-type terminal device. Therefore, when the network device does not determine a type of the terminal device, a transmission error is likely to occur when the network device schedules some uplink channels in the access process. For example, because the initial uplink BWP of the first-type terminal device and the initial uplink BWP of the second-type terminal device have different frequency domain ranges, the network device needs to identify whether a currently accessed user is the first-type terminal device or the second-type terminal device, to determine a range, of a specific initial uplink BWP, in which uplink transmission of the currently accessed terminal device is scheduled, for example, transmission of the Msg3. Otherwise, a transmission error may occur.

Based on this, embodiments of this application provide a communication method and apparatus, to resolve a problem that when a network device does not determine a type of a terminal device, a transmission error occurs when the network device schedules some uplink channels in a random access procedure. The method and the apparatus are based on a same disclosure concept. Because the method and the apparatus have a similar problem-resolving principle, for implementations of the apparatus and the method, refer to each other, and no repeated description is provided.

The communication method provided in this application may be applied to various communication systems, for example, internet of things (internet of things, IoT), narrow band internet of things (narrow band internet of things, NB-IoT), long term evolution (long term evolution, LTE), a 5th generation (5G) communication system, an LTE and 5G hybrid architecture, a 5G new radio (new radio, NR) system, and a 6G system or a new communication system emerging in future communication development. The 5G communication system described in this application may include at least one of a non-standalone (non-standalone, NSA) 5G communication system and a standalone (standalone, SA) 5G communication system. The communication system may alternatively be a machine to machine (machine to machine, M2M) network or another network.

FIG. 1 shows a communication system according to an embodiment of this application. The communication system includes a network device and six terminal devices, namely, UE 1 to UE 6. In the communication system, the UE 1 to the UE 6 may send uplink data to the network device, and the network device may receive the uplink data sent by the UE 1 to the UE 6. In addition, the UE 4 to the UE 6 may also constitute a communication subsystem. The network device may send downlink information to the UE 1, the UE 2, the UE 3, and the UE 5, and the UE may send the downlink information to the UE 4 and the UE 6 based on a device-to-device (device-to-device, D2D) technology. FIG. 1 is merely a schematic diagram, and a type of a communication system, a quantity of devices included in the communication system, a type of a device included in the communication system, and the like are not specifically limited.

A network architecture and a service scenario described in embodiments of this application are intended to describe the technical solutions in embodiments of this application clearer, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

The following describes the technical solutions in embodiments of this application with reference to the accompanying drawings in embodiments of this application. Embodiments of this application may be used in a scenario in which the network device schedules an uplink channel in a random access procedure. For example, the network device schedules an uplink channel such as a common PUCCH used for HARQ-ACK feedbacks of a Msg1, a Msg3, and a Msg4. For ease of description, in the following, with reference to a scenario in which the network device schedules the Msg3, an example in which the method is performed by the network device and the terminal device is used for description.

Figure 2:
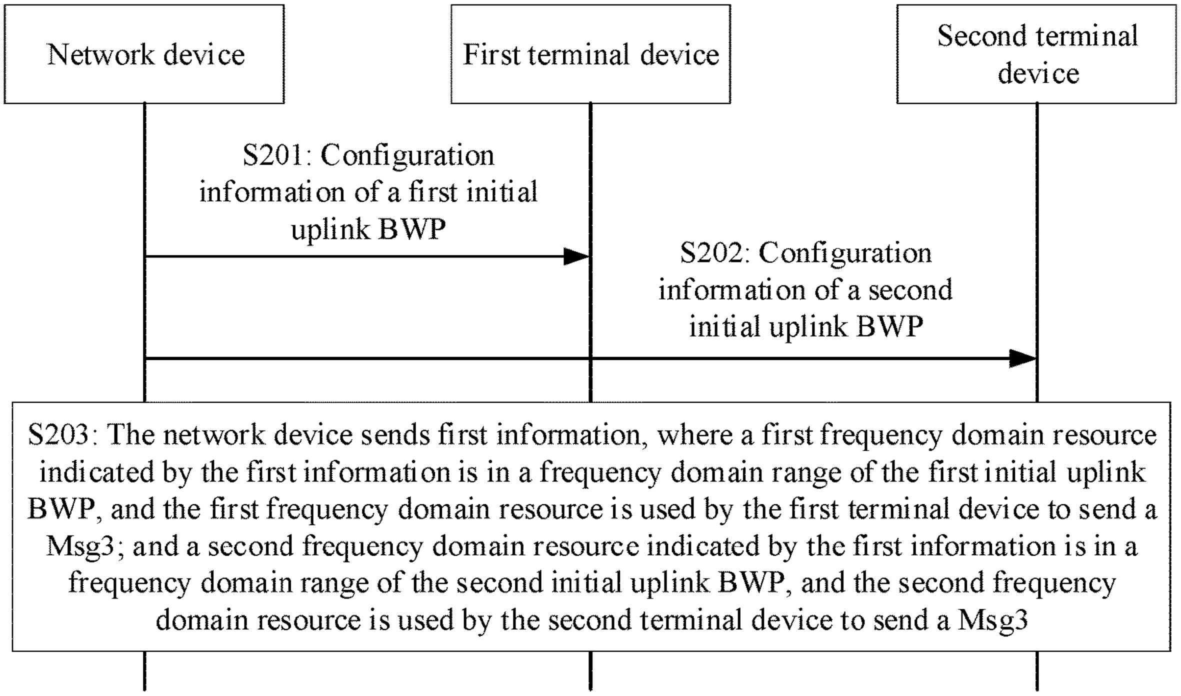
FIG. 2 is a schematic flowchart of a communication method according to an embodiment of this application.

FIG. 2 is a schematic flowchart of a communication method according to this application. The method includes the following steps.

S201: A network device sends configuration information of a first initial uplink BWP to a first terminal device.

The first terminal device is a first-type terminal device, and the first initial uplink BWP may be an initial uplink BWP corresponding to the first terminal device.

S202: The network device sends configuration information of a second initial uplink BWP to a second terminal device.

The second terminal device is a second-type terminal device, and the second initial uplink BWP may be an initial uplink BWP corresponding to the second terminal device.

Optionally, the network device may alternatively send the configuration information of the second initial uplink BWP to the first terminal device, and the network device may alternatively send the configuration information of the first initial uplink BWP to the second terminal device.

In an example for description, the first-type terminal device may be a legacy (legacy) terminal device in a communication system, and the second-type terminal device may be a reduced capability (reduced capability, REDCAP) terminal device. The REDCAP terminal device may be a terminal device having a lower capability than that of the legacy terminal device. The REDCAP terminal device may have the following feature: A capability of the terminal is reduced or limited. For example, a bandwidth capability is limited. In comparison with the legacy terminal device, a maximum channel bandwidth is reduced to 20 MHz.

It should be noted that a sequence of S201 and S202 is not limited in this application.

S203: The network device sends first information.

A first frequency domain resource indicated by the first information is in a frequency domain range of the first initial uplink BWP, and the first frequency domain resource is used by the first terminal device to send a Msg3; and a second frequency domain resource indicated by the first information is in a frequency domain range of the second initial uplink BWP, and the second frequency domain resource is used by the second terminal device to send a Msg3. When the first information indicates a transmission resource of the Msg3, the first information may be carried in a Msg2 or other dedicated signaling. When the first information indicates a transmission resource of another channel, the first information may be carried in UE dedicated signaling or a broadcast message.

In an example for description, the first information may be a resource indication value (resource indication value, RIV). Specifically, the resource indication value is a resource indication value of a frequency domain resource. The following uses an example in which the first information is the RIV to describe a process of scheduling the Msg3 by the network device.

In an example for description, the first information may be carried in a random access response uplink grant (RAR UL grant) or downlink control information (downlink control information, DCI) scrambled by using a temporary cell radio network temporary identifier (temporary cell RNTI, TC-RNTI). In a specific implementation, the first information may be carried in a frequency domain resource allocation field in the RAR UL grant or the DCI scrambled by using the TC-RNTI.

Specifically, the network device may send the first information to at least one terminal device in the first terminal device and the second terminal device. For example, the network device sends the first information to the first terminal device, or the network device sends the first information to the second terminal device. Alternatively, the network device may send the first information to both the first terminal device and the second terminal device.

Optionally, after the network device sends the first information to the first terminal device, the first terminal device may determine the first frequency domain resource based on the first information. The first terminal device may send the Msg3 on the first frequency domain resource.

After the network device sends the first information to the second terminal device, the second terminal device may determine the second frequency domain resource based on the first information. The second terminal device may send the Msg3 on the second frequency domain resource.

In this embodiment of this application, when scheduling the Msg3, the network device may send same scheduling information (namely, the first information) for two types of terminal devices. The scheduling information may indicate the first terminal device to perform transmission of the Msg3 in a range of an initial uplink BWP (namely, the first initial uplink BWP) of the first terminal device, and the scheduling information may indicate the second terminal device to perform transmission of the Msg3 in a range of an initial uplink BWP (namely, the second initial uplink BWP) of the second terminal device. In the foregoing manner, when the network device does not determine a type of the terminal device, the network device may schedule, by using a same indication value, terminal devices in ranges of different BWPs to perform transmission of the Msg3, to avoid a transmission error caused because a scheduling resource of the Msg3 is not in the range of the initial uplink BWP of the terminal device.

The following describes an example of a possible specific implementation process of S203.

In a possible implementation 1, when scheduling the Msg3, the network device may allocate a same frequency domain resource to the first terminal device and the second terminal device. That is, a frequency domain range of the first frequency domain resource may be the same as a frequency domain range of the second frequency domain resource. In other words, an absolute frequency domain location of the first frequency domain resource is the same as an absolute frequency domain location of the second frequency domain resource, and a length of the first frequency domain resource is the same as a length of the second frequency domain resource. For example, in an implementation, the network device may allocate the frequency domain resource for the Msg3 to the first terminal device and the second terminal device in a first frequency domain resource set, and a RIV of any frequency domain resource in the first frequency domain resource set for the first terminal device is the same as a RIV of any frequency domain resource for the second terminal device. In this implementation, the first frequency domain resource is the same as the second frequency domain resource. For ease of description, in this implementation, the first frequency domain resource and the second frequency domain resource are collectively referred to as a Msg3 frequency domain resource.

It should be understood that "the RIV of the frequency domain resource for the first terminal device (or the second terminal device)" may be understood as a RIV determined by the network device for the first terminal device (or the second terminal device). The following describes an example of a process in which the network device determines the RIVs for the first terminal device and the second terminal device.

Example 1: For the first terminal device, the network device may determine the RIV based on a start location and a length of the Msg3 frequency domain resource and a size of the first initial uplink BWP. It should be noted that the start location of the Msg3 frequency domain resource herein is a start location of the Msg3 frequency domain resource in the first initial uplink BWP, namely, a relative frequency domain location of the Msg3 frequency domain resource in the first initial uplink BWP. For example, the start location of the Msg3 frequency domain resource herein may be an RB index in the first initial uplink BWP.

For the second terminal device, the network device may determine the RIV based on a start location and a length of the Msg3 frequency domain resource and a size of the second initial uplink BWP. It should be noted that the start location of the Msg3 frequency domain resource herein is a start location of the Msg3 frequency domain resource in the second initial uplink BWP, namely, a relative frequency domain location of the Msg3 frequency domain resource in the second initial uplink BWP. For example, the start location of the Msg3 frequency domain resource herein may be an RB index in the second initial uplink BWP.

In this embodiment of this application, the length of the Msg3 frequency domain resource may be understood as a length or a quantity of consecutively allocated RBs.

The following describes a method for determining the RIV of the Msg3 frequency domain resource for the first terminal device and a method for determining the RIV of the Msg3 frequency domain resource for the second terminal device by using examples.

The methods for determining the RIV of the Msg3 frequency domain resource for the first terminal device and the RIV of the Msg3 frequency domain resource for the second terminal device may be as follows:

$$\text{If}(L_{RBs}-1)\le\left\lfloor\frac{N_{BWP}^{size}}{2}\right\rfloor,\ RIV=N_{BWP}^{size}(L_{RBs}-1)+RB_{start};\text{ or}$$

$$\text{if}(L_{RBs}-1)>\left\lfloor\frac{N_{BWP}^{size}}{2}\right\rfloor,$$

$$RIV=N_{BWP}^{size}\left(N_{BWP}^{size}-L_{RBs}+1\right)+\left(N_{BWP}^{size}-1-RB_{start}\right).$$

When the network device determines the RIV for the first terminal device according to the foregoing determining method, $RB_{start}$ is the start location of the Msg3 frequency domain resource in the first initial uplink BWP, $L_{RBs}$ is the length of the Msg3 frequency domain resource, and $$N_{BWP}^{size}$$

is the size of the first initial uplink BWP, namely, a quantity of RBs, where $L_{RBs}\ge 1$ and cannot exceed $$N_{BWP}^{size}-RB_{start},$$

and ⌊⌋ is a floor operation.

When the network device determines the RIV for the second terminal device according to the foregoing determining method, $RB_{start}$ is the start location of the Msg3 frequency domain resource in the second initial uplink BWP, $L_{RBs}$ is the length of the Msg3 frequency domain resource, and $$N_{BWP}^{size}$$

is the size of the second initial uplink BWP, namely, a quantity of RBs, where $L_{RBs}\ge 1$ and cannot exceed $$N_{BWP}^{size}-RB_{start}.$$

Optionally, the network device may determine the first information based on a determining process of two terminal devices, or may determine the first information based on a determining process of any terminal device.

Correspondingly, after receiving the first information, the first terminal device and the second terminal device may determine the Msg3 frequency domain resource based on an inverse process of the foregoing determining process. For example, the first terminal device determines the start location $RB_{start}$ of the Msg3 frequency domain resource in the first initial uplink BWP and the length $L_{RBs}$ of the Msg3 frequency domain resource based on the first information, the foregoing formula, and the size $$N_{BWP}^{size}$$

of the first initial uplink BWP. The second terminal device determines the start location $RB_{start}$ of the Msg3 frequency domain resource in the second initial uplink BWP and the length $L_{RBs}$ of the Msg3 frequency domain resource based on the first information, the foregoing formula, and the size $$N_{BWP}^{size}$$

of the second initial uplink BWP.

The following describes a method for determining the Msg3 frequency domain resource by the first terminal device and a method for determining the Msg3 frequency domain resource by the second terminal device by using examples.

The methods for determining the Msg3 frequency domain resource by the first terminal device and the second terminal device may be as follows:

If $$N_{BWP}^{size} \leq 180;$$

or for a shared spectrum channel access scenario, if $$N_{BWP}^{size} \leq 90,$$

the frequency domain resource allocation field is truncated to $$\lceil \log_2(N_{BWP}^{size} \cdot (N_{BWP}^{size} + 1)/2 \rceil$$

least significant bits of the frequency domain resource allocation field, and the Msg3 frequency domain resource is determined based on the RIV included in the frequency domain resource allocation field. Otherwise, after $N_{UL,hop}$ bits, $$\lceil \log_2(N_{BWP}^{size} \cdot (N_{BWP}^{size} + 1)/2 \rceil - 14$$

most significant bits are inserted into the frequency domain resource allocation field; or for a shared spectrum channel access scenario, $$\lceil \log_2(N_{BWP}^{size} \cdot (N_{BWP}^{size} + 1)/2 \rceil - 12$$

most significant bits are inserted into the frequency domain resource allocation field, and a value of the inserted bits is set to '0', where $N_{UL,hop}$ bits indicate Msg3 frequency hopping information, and the Msg3 frequency domain resource is determined based on the RIV included in the frequency domain resource allocation field.

The process of determining the Msg3 frequency domain resource based on the RIV included in the frequency domain resource allocation field may be as follows:

$$\text{If}(L_{RBs} - 1) \leq \left\lfloor \frac{N_{BWP}^{size}}{2} \right\rfloor, RIV = N_{BWP}^{size}(L_{RBs} - 1) + RB_{start}; \text{ or}$$

$$\text{if}(L_{RBs} - 1) > \left\lfloor \frac{N_{BWP}^{size}}{2} \right\rfloor,$$

$$RIV = N_{BWP}^{size}(N_{BWP}^{size} - L_{RBs} + 1) + (N_{BWP}^{size} - 1 - RB_{start}).$$

When the first terminal device determines the Msg3 frequency domain resource, $RB_{start}$ is the start location of the Msg3 frequency domain resource in the first initial uplink BWP, $L_{RBs}$ is the length of the Msg3 frequency domain resource, and $$N_{BWP}^{size}$$

is the size of the first initial uplink BWP, namely, a quantity of RBs, where $L_{RBs} \geq 1$ and cannot exceed $$N_{BWP}^{size} - RB_{start}.$$

The first terminal device may determine, according to the foregoing method, the frequency domain resource of the Msg3 in the first initial uplink BWP by using the frequency domain resource allocation field, and the frequency domain resource includes the start location of the frequency domain resource, namely, a start RB, and the length or the quantity of consecutively allocated RBs.

When the second terminal device determines the Msg3 frequency domain resource, $RB_{start}$ is the start location of the Msg3 frequency domain resource in the second initial uplink BWP, $L_{RBs}$ is the length of the Msg3 frequency domain resource, and $$N_{BWP}^{size}$$

is the size of the second initial uplink BWP, namely, a quantity of RBs, where $L_{RBs} \geq 1$ and cannot exceed $$N_{BWP}^{size} - RB_{start}.$$

The second terminal device may determine, according to the foregoing method, the frequency domain resource of the Msg3 in the second initial uplink BWP by using the frequency domain resource allocation field, and the frequency domain resource includes the start location of the frequency domain resource, namely, a start RB, and the length or the quantity of consecutively allocated RBs.

Example 2: For the first terminal device and the second terminal device, the network device may determine the RIV based on a start location and a length of the Msg3 frequency domain resource and a size of the first initial uplink BWP.

Determining methods used by the network device to determine the first terminal device and the second terminal device are similar to the methods for determining the RIVs of the Msg3 frequency domain resource for the first terminal device and the second terminal device in the foregoing embodiment. A difference lies in that in Example 1, when the network device determines the RIVs for the first terminal device and the second terminal device according to the foregoing determining methods, meanings of $$N_{BWP}^{size}$$

are different. For example, when the RIV for the first terminal device is determined, $$N_{BWP}^{size}$$

is the size of the first initial uplink BWP, namely, a quantity of RBs. When the RIV for the second terminal device is determined, $$N_{BWP}^{size}$$

is a size of the second initial uplink BWP, namely, a quantity of RBs. In Example 2, when the network device determines the RIVs for the first terminal device and the second terminal device according to the foregoing determining methods, meanings of $$N_{BWP}^{size}$$

are the same, and $$N_{BWP}^{size}$$

is the size of the first initial uplink BWP, namely, a quantity of RBs. For a specific process, refer to related descriptions in Example 1. No repeated description is provided.

Correspondingly, after receiving the first information, the first terminal device and the second terminal device may determine the Msg3 frequency domain resource based on the first information and the size of the first initial uplink BWP. Methods used by the first terminal device and the second terminal device to determine the Msg3 frequency domain resource are similar to the methods used by the first terminal device and the second terminal device to determine the Msg3 frequency domain resource in the foregoing embodiment. A difference lies in that in Example 1, when the first terminal device and the second terminal device determine the Msg3 frequency domain resource, meanings of $$N_{BWP}^{size}$$

are different. For example, the first terminal device determines the Msg3 frequency domain resource by using the size of the first initial uplink BWP, that is, $$N_{BWP}^{size}$$

is the size of the first initial uplink BWP. The second terminal device determines the Msg3 frequency domain resource by using the size of the second initial uplink BWP, that is, $$N_{BWP}^{size}$$

is the size of the second initial uplink BWP. In Example 2, when the first terminal device and the second terminal device determine the Msg3 frequency domain resource, meanings of $$N_{BWP}^{size}$$

are the same. In other words, both the first terminal device and the second terminal device determine the Msg3 frequency domain resource by using the size of the first initial uplink BWP, that is, $$N_{BWP}^{size}$$

is the size of the first initial uplink BWP, namely, a quantity of RBs. For a specific process, refer to related descriptions in Example 1. No repeated description is provided.

It may be understood that for the first terminal device and the second terminal device, the network device may alternatively determine the RIV based on the start location and the length of the Msg3 frequency domain resource and the second initial uplink BWP. Correspondingly, after receiving the first information, the first terminal device and the second terminal device may determine the Msg3 frequency domain resource based on the first information and the size of the second initial uplink BWP.

Optionally, in the foregoing two examples, when the network device determines the RIV for the first terminal device, the start location of the Msg3 frequency domain resource may alternatively be a start location of the Msg3 frequency domain resource in the second initial uplink BWP. Correspondingly, the first terminal device may determine an absolute frequency domain location of the Msg3 frequency domain resource based on the start location of the second initial uplink BWP and the start location of the Msg3 frequency domain resource determined based on the first information.

Alternatively, when the network device determines the RIV for the second terminal device, the start location of the Msg3 frequency domain resource may alternatively be a start location of the Msg3 frequency domain resource in the first initial uplink BWP. Correspondingly, the second terminal device may determine an absolute frequency domain location of the Msg3 frequency domain resource based on the start location of the first initial uplink BWP and the start location of the Msg3 frequency domain resource determined based on the first information.

The second terminal device is used as an example. That the second terminal device determines the absolute frequency domain location of the Msg3 frequency domain resource based on the start location of the first initial uplink BWP and the start location of the Msg3 frequency domain resource determined based on the first information may be implemented by using the following method: determining the location of the Msg3 frequency domain resource by using the start location of the first initial uplink BWP. Alternatively, the start location of the Msg3 frequency domain resource is determined by using both the start location of the second initial uplink BWP and a first offset value, and the first offset value is a frequency domain offset value between the start location of the first initial uplink BWP and the start location of the second initial uplink BWP. The frequency domain offset value between the start location of the first initial uplink BWP and the start location of the second initial uplink BWP may be notified by the network device by using signaling, or may be determined by the second terminal device based on the configuration information of the first initial uplink BWP and the configuration information of the second initial uplink BWP.

A manner in which the first terminal device determines the absolute frequency domain location of the Msg3 frequency domain resource based on the start location of the second initial uplink BWP and the start location of the Msg3 frequency domain resource determined based on the first information is similar to the manner in the foregoing process. Details are not described herein again.

Optionally, in the foregoing implementation 1, the start location of the first initial uplink BWP may be the same as the start location of the second initial uplink BWP. For example, that the start location of the first initial uplink BWP is the same as the start location of the second initial uplink BWP may be protocol-predefined. For another example, that the start location of the first initial uplink BWP is the same as the start location of the second initial uplink BWP may alternatively be determined by the network device based on an algorithm. In the foregoing implementation, the Msg3 frequency domain resource scheduled by the network device is in the frequency domain range of the second initial uplink BWP, so that it may be ensured that the Msg3 frequency domain resource is also in the frequency domain range of the first initial uplink BWP.

Figure 3:
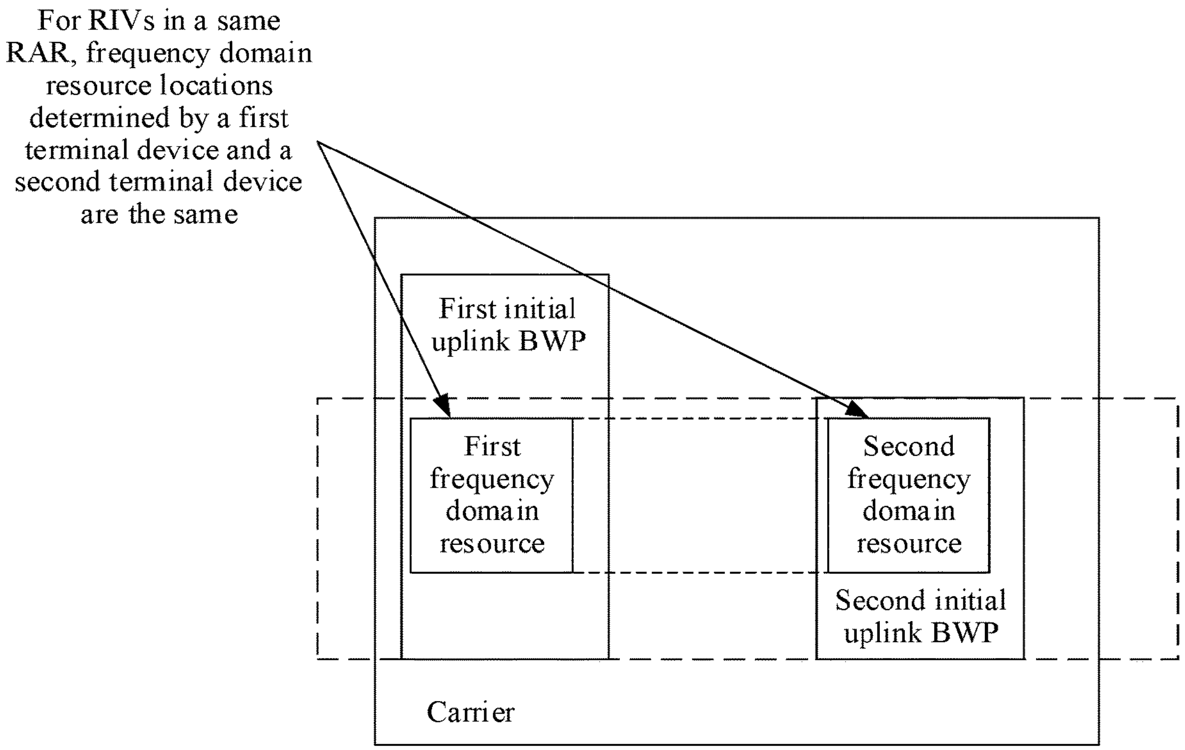
FIG. 3 is a schematic diagram of a type of resource allocation according to an embodiment of this application.

For example, the Msg3 frequency domain resource allocated by the network device to the first terminal device and the second terminal device may be shown in FIG. 3.

In another possible implementation 2, when scheduling the Msg3, the network device may allocate different frequency domain resources to the first terminal device and the second terminal device. That is, the frequency domain range of the first frequency domain resource may be different from the frequency domain range of the second frequency domain resource.

For example, in an implementation, the network device may allocate, in a second frequency domain resource set, the first frequency domain resource to the first terminal device, and allocate the second frequency domain resource to the second terminal device. The second frequency domain resource set includes at least one frequency domain resource subset. Any frequency domain resource subset includes a first-type frequency domain resource and a second-type frequency domain resource. In a same frequency domain resource subset, a RIV of any first-type frequency domain resource for the first terminal device is the same as a RIV of any second-type frequency domain resource for the second terminal device.

In this implementation, the first frequency domain resource may be a first-type frequency domain resource in a first frequency domain resource subset in the second frequency domain resource set, and the second frequency domain resource may be a second-type frequency domain resource in the first frequency domain resource subset in the second frequency domain resource set.

For example, the second frequency domain resource includes at least one frequency domain resource subset, any frequency domain resource subset includes a frequency domain resource 1 and a frequency domain resource 2, and a RIV of the frequency domain resource 1 for the first terminal device is the same as a RIV of the frequency domain resource 2 for the second terminal device. The network device may allocate, in the second frequency domain resource set, the first frequency domain resource to the first terminal device, and allocate the second frequency domain resource to the second terminal device. For example, the network device may select a frequency domain resource subset 1 in the second frequency domain resource set, allocate a frequency domain resource 1 in the frequency domain resource subset 1 to the first terminal device, and allocate a frequency domain resource 2 in the frequency domain resource subset 1 to the second terminal device.

In a specific example, a TDD spectrum is used, a bandwidth is 100 MHz, a subcarrier spacing is 30 kHz, the size of the first initial uplink BWP is 273 PRBs, and the size of the second initial uplink BWP is 51 PRBs. The frequency domain resource set 1 in the second frequency domain resource set includes one frequency domain resource A scheduled in the first initial uplink BWP, where a start location of the frequency domain resource A is 0 and a length of the frequency domain resource A is 2; and further includes one frequency domain resource B scheduled in the second initial uplink BWP, where a start location of the frequency domain resource B is 18 and a length of the frequency domain resource B is 6. When determining the RIV for the first terminal device, the network device may determine the RIV according to the formula in the foregoing implementation 1, where $RB_{start}$ is 0, $L_{RBs}$ is 2, $$N_{BWP}^{size}$$

is 273, and the calculated RIV is 273. When determining the RIV for the second terminal device, the network device may determine the RIV according to the formula in the foregoing implementation 1, where $RB_{start}$ is 18, $L_{RBs}$ is 6, $$N_{BWP}^{size}$$

is 51, and the calculated RIV is 273. Therefore, the network device may allocate the first frequency domain resource whose $RB_{start}$ is 0 and $L_{RBs}$ is 2 to the first terminal device, and allocate the second frequency domain resource whose $RB_{start}$ is 18 and $L_{RBs}$ is 6 to the second terminal device.

Optionally, the process in which the network device determines the RIVs for the first terminal device and the second terminal device in the implementation 2 is similar to the process in which the network device determines the RIVs for the first terminal device and the second terminal device in the implementation 1. A difference lies in that in the implementation 1, the network device determines the RIVs for the first terminal device and the second terminal device based on a same frequency domain resource (namely, the Msg3 frequency domain resource), while in the implementation 2, the network device determines the RIVs for the first terminal device and the second terminal device based on different frequency domain resources. Specifically, the network device determines the RIV for the first terminal device based on the first frequency domain resource, and determines the RIV for the second terminal device based on the second frequency domain resource. For a specific process, refer to related descriptions in the implementation 1. No repeated description is provided.

Correspondingly, the manner in which the first terminal device and the second terminal device determine the Msg3 frequency domain resource in the implementation 2 is similar to that in the implementation 1. A difference lies in that in the implementation 1, the first terminal device and the second terminal device determine a same frequency domain resource (namely, the Msg3 frequency domain resource), while in the implementation 2, the first terminal device determines the first frequency domain resource, and the second terminal device determines the second frequency domain resource. For a specific method, refer to related descriptions in the implementation 1. No repeated description is provided.

Figure 4:
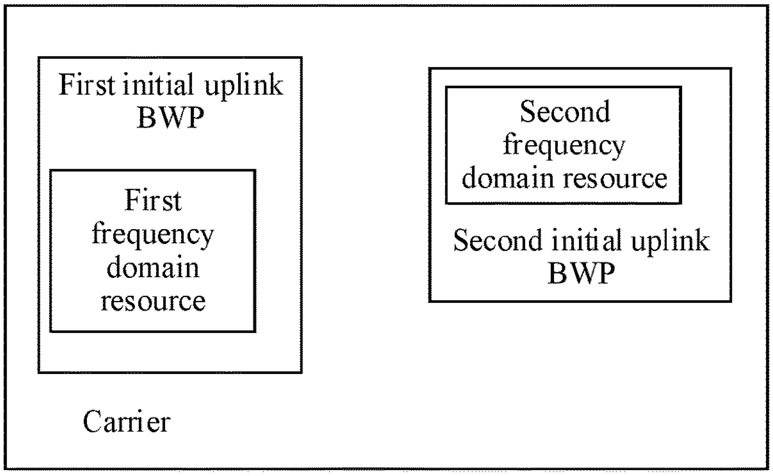
FIG. 4 is a schematic diagram of another type of resource allocation according to an embodiment of this application.

For example, the Msg3 frequency domain resource allocated by the network device to the first terminal device and the second terminal device may be shown in FIG. 4.

In some embodiments, after step S203, the network device may detect the Msg3 sent by the first terminal device and/or the second terminal device. For example, the network device may detect, on the first frequency domain resource, the Msg3 sent by the first terminal device, and detect, on the second frequency domain resource, the Msg3 sent by the second terminal device.

If the Msg3 sent by the first terminal device and/or the second terminal device is detected, the network device sends a Msg4 to the first terminal device and/or the second terminal device. Otherwise, the network device indicates or schedules, by using downlink control information (downlink control information, DCI), the first terminal device and/or the second terminal device to perform retransmission of the Msg3, and the DCI scrambles a CRC by using the TC-RNTI. For the method for determining the RIV included in the frequency domain resource allocation field carried in the DCI, refer to the method for determining the first information in S203.

Correspondingly, the first terminal device and/or the second terminal device detect/detects the DCI in which the TC-RNTI scrambles the CRC. If the DCI indicates retransmission of the Msg3, the Msg3 is resent based on information in the DCI.

Optionally, if the DCI indicates the Msg4, the Msg4 is received based on the information in the DCI.

In this embodiment of this application, when scheduling the Msg3, the network device may send same scheduling information (namely, the first information) for two types of terminal devices. The scheduling information may indicate the first terminal device to perform transmission of the Msg3 in a range of an initial uplink BWP (namely, the first initial uplink BWP) of the first terminal device, and the scheduling information may indicate the second terminal device to perform transmission of the Msg3 in a range of an initial uplink BWP (namely, the second initial uplink BWP) of the second terminal device. In the foregoing manner, when the network device does not determine a type of the terminal device, the network device may schedule, by using a same indication value, terminal devices in ranges of different BWPs to perform transmission of the Msg3, to avoid a transmission error.

In this embodiment of this application, a same frequency domain resource may be allocated to different types of terminal devices for transmission of the Msg3, so that the network device may not need to identify the type of the terminal device by using a Msg1, to reduce Msg1 resource overheads and avoid a waste of Msg3 resources. In addition, when the network device allocates a same frequency domain resource to different types of terminal devices in ranges of different BWPs, it may be ensured that absolute frequency domain locations for transmission of the Msg3 by two types of terminals are the same by restricting a same start location of an initial uplink BWP or considering an offset value between start locations of different initial uplink BWPs, to avoid a transmission error.

In this embodiment of this application, different frequency domain resources may alternatively be allocated to different types of terminal devices for transmission of the Msg3, so that the network device may not need to identify the type of the terminal device by using the Msg1, to reduce Msg1 resource overheads, and enable, by using same information, different types of terminal devices working in ranges of different BWPs to successfully access. In this way, an access success rate of the terminal device without increasing signaling overheads may be increased.

Figure 5:
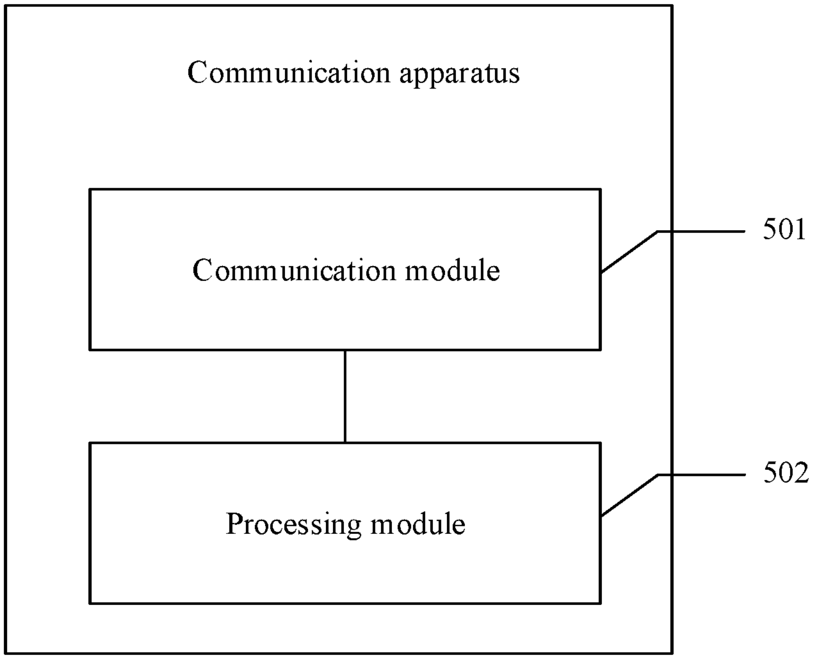
FIG. 5 is a schematic diagram of a structure of a communication apparatus according to an embodiment of this application.

Based on a same disclosure concept as the method embodiments, an embodiment of this application provides a communication apparatus. A structure of the communication apparatus may be shown in FIG. 5. The communication apparatus includes a communication module 501 and a processing module 502.

In a specific implementation, the communication apparatus may be configured to implement the method performed by the network device in the embodiment in FIG. 2. The apparatus may be the network device, or may be a chip or a chip set in the network device, or a part of a chip that is configured to perform a related method function. The communication module 501 is configured to communicate with a terminal device. The processing module 502 is configured to: send configuration information of a first initial uplink BWP to a first terminal device through the communication module 501; send configuration information of a second initial uplink BWP to a second terminal device through the communication module 501; and send first information to the first terminal device through the communication module 501, and/or send the first information to the second terminal device through the communication module 501.

A first frequency domain resource indicated by the first information is in a frequency domain range of the first initial uplink BWP, and the first frequency domain resource is used by the first terminal device to send a Msg3; a second frequency domain resource indicated by the first information is in a frequency domain range of the second initial uplink BWP, and the second frequency domain resource is used by the second terminal device to send a Msg3; and the first terminal device is a first-type terminal device, and the second terminal device is a second-type terminal device.

Optionally, the processing module 502 is further configured to: after sending the first information to the first terminal device through the communication module 501, receive the Msg3 from the first terminal device on the first frequency domain resource through the communication module 501; and/or after sending the first information to the second terminal device through the communication module 501, receive the Msg3 from the second terminal device on the second frequency domain resource through the communication module 501.

Optionally, the processing module 502 is further configured to: for the second terminal device, determine the first information based on a start location and a length of the second frequency domain resource and the first initial uplink BWP; or for the first terminal device, determine the first information based on a start location and a length of the first frequency domain resource and the second initial uplink BWP.

In a specific implementation, the communication apparatus may be configured to implement the method performed by the terminal device in the embodiment in FIG. 2. The apparatus may be the terminal device, or may be a chip or a chip set in the terminal device, or a part of a chip that is configured to perform a related method function. The communication module 501 is configured to receive first information from a network device, where the first information indicates a first frequency domain resource for sending a Msg3 in a random access procedure. The processing module 502 is configured to determine the first frequency domain resource based on the first information and a second initial uplink BWP, where the first frequency domain resource is in a frequency domain range of a first initial uplink BWP, the first initial uplink BWP is an initial uplink BWP of the first terminal device, and the second initial uplink BWP is an initial uplink BWP of a second terminal device.

Optionally, the processing module 502 may be configured to determine a start location of the first frequency domain resource and a length of the first frequency domain resource based on the first information and a size of the second initial uplink BWP.

Alternatively, the processing module 502 may be configured to determine a start location of the first frequency domain resource and a length of the first frequency domain resource based on the first information, the first initial uplink BWP, and a first offset value, where the first offset value is a frequency domain offset value between a start location of the first initial uplink BWP and a start location of the second initial uplink BWP.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that for functions or implementations of the modules in embodiments of this application, further refer to related description in the method embodiments.

Figure 6:
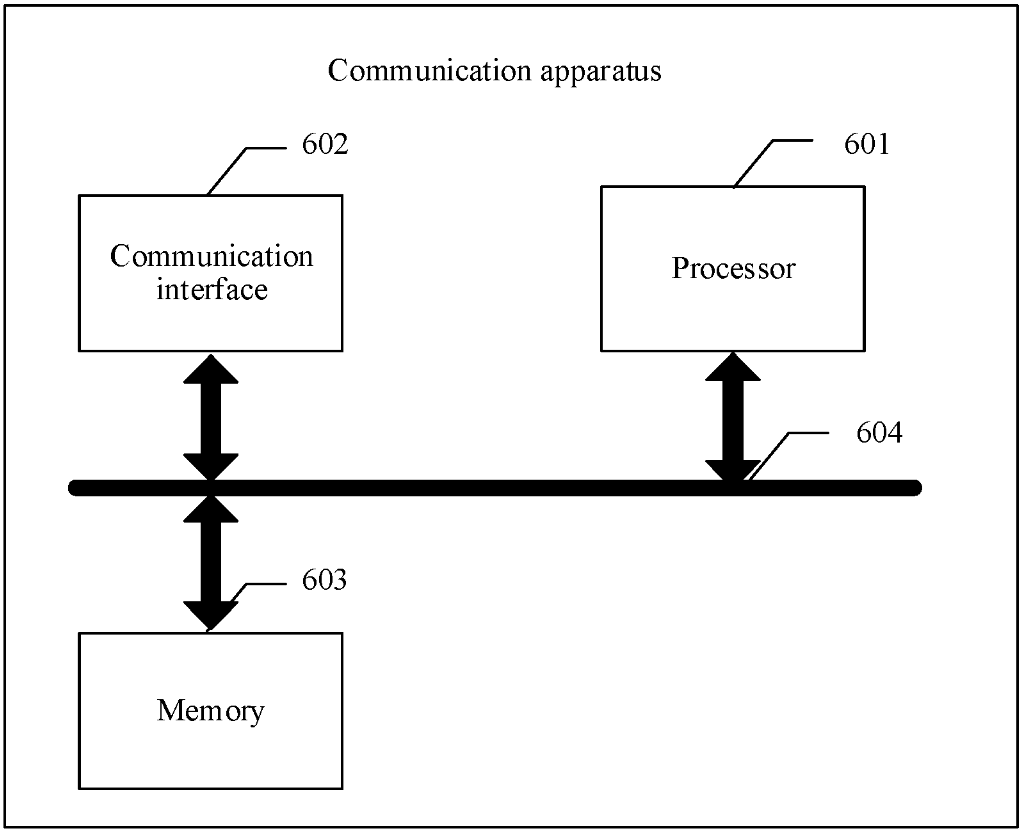
FIG. 6 is a schematic diagram of a structure of a communication apparatus according to an embodiment of this application.

In a possible implementation, the communication apparatus may be shown in FIG. 6. The apparatus may be a communication device or a chip in the communication device. The communication device may be the terminal device in the foregoing embodiments or the network device in the foregoing embodiments. The apparatus includes a processor 601 and a communication interface 602, and may further include a memory 603. The processing module 502 may be the processor 601. The communication module 501 may be the communication interface 602.

The processor 601 may be a CPU, a digital processing unit, or the like. The communication interface 602 may be a transceiver, an interface circuit such as a transceiver circuit, a transceiver chip, or the like. The apparatus further includes a memory 603, configured to store a program executed by the processor 601. The memory 603 may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory 603 is any other medium that can be used to carry or store expected program code in a form of an instruction structure or a data structure and that can be accessed by a computer, but is not limited thereto.

The processor 601 is configured to execute the program code stored in the memory 603, and is configured to perform an action of the processing module 502. Details are not described herein again in this application. The communication interface 602 is configured to perform an action of the communication module 501. Details are not described in this application again.

A specific connection medium between the communication interface 602, the processor 601, and the memory 603 is not limited in this embodiment of this application. In this embodiment of this application, the memory 603, the processor 601, and the communication interface 602 are connected through a bus 604 in FIG. 6. The bus is represented by using a bold line in FIG. 6. A manner of connection between other components is merely an example for description, and is not limited thereto. The bus may be classified into an address bus, a data bus, a control bus, and the like. For ease of representation, the bus is represented by using only one bold line in FIG. 6. However, this does not indicate that there is only one bus or only one type of bus.

Figure 7:
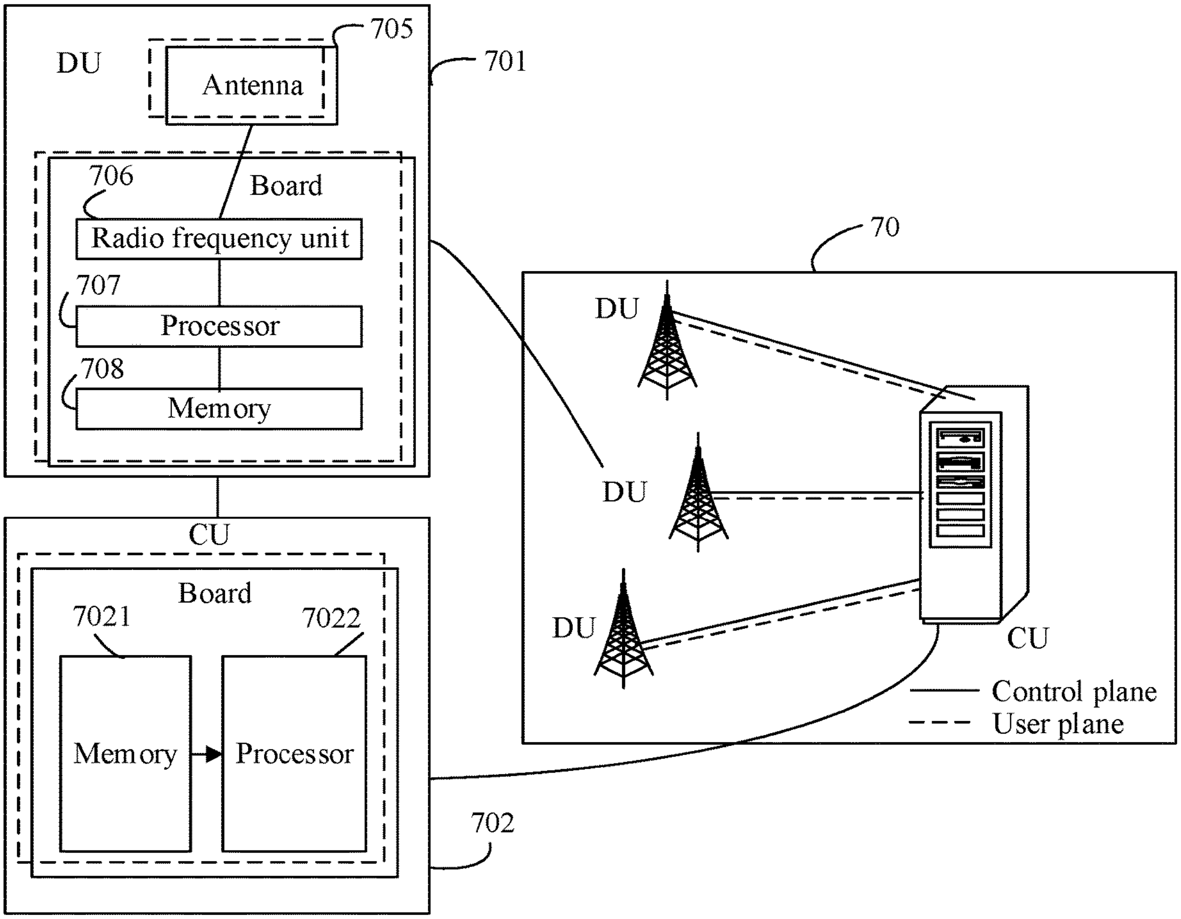
FIG. 7 is a schematic diagram of a structure of a network device according to an embodiment of this application.

FIG. 7 is a schematic diagram of a structure of a network device according to an embodiment of this application, for example, may be a schematic diagram of a structure of a network device. The network device may be applied to the system shown in FIG. 1, and perform a function of the network device in the method embodiment shown in FIG. 2. The network device 70 may include one or more distributed units (distributed units, DUs) 701 and one or more central units (central units, CUs) 702. The DU 701 may include at least one antenna 705, at least one radio frequency unit 706, at least one processor 707, and at least one memory 708. The DU 701 is mainly configured to receive and send a radio frequency signal, convert a radio frequency signal and a baseband signal, and perform some baseband processing. The CU 702 may include at least one processor 7022 and at least one memory 7021. The CU 702 and the DU 701 may communicate with each other through an interface. A control plane (Control plane) interface may be Fs-C, for example, F1-C. A user plane (User Plane) interface may be Fs-U, for example, F1-U.

The CU 702 is mainly configured to: perform baseband processing, control the network device, and the like. The DU 701 and the CU 702 may be physically disposed together, or may be physically disposed separately, in other words, may be a distributed base station. The CU 702 is a control center of the network device, may also be referred to as a processing unit, and is mainly configured to complete a baseband processing function. For example, the CU 702 may be configured to control the network device to perform an operation procedure related to the network device in the method embodiments in FIG. 3 and FIG. 4.

Specifically, baseband processing on the CU and the DU may be divided based on protocol layers of a radio network. For example, functions of a packet data convergence protocol (packet data convergence protocol, PDCP) layer and a protocol layer above the PDCP layer are set in the CU.

Functions of protocol layers below the PDCP layer, for example, a radio link control (radio link control, RLC) layer and a media access control (media access control, MAC) layer, are set in the DU. For another example, the CU implements functions of an RRC layer and the PDCP layer, for example, receiving and sending actions in embodiments of this application, and the DU implements functions of the RLC layer, the MAC layer, and a physical (physical, PHY) layer, for example, an action of determining a transmission manner in embodiments of this application.

In addition, optionally, the network device 70 may include one or more radio frequency units (RUs), one or more DUs, and one or more CUs. The DU may include at least one processor 707 and at least one memory 708, the DU may include at least one antenna 705 and at least one radio frequency unit 706, and the CU may include at least one processor 7022 and at least one memory 7021.

In an example, the CU 702 may include one or more boards, and a plurality of boards may jointly support a radio access network (for example, a 5G network, or a 6G network) of a single access standard, or may separately support radio access networks (for example, an LTE network, a 5G network, a 6G network, and another network) of different access standards. The memory 7021 and the processor 7022 may serve one or more boards. In other words, a memory and a processor may be disposed on each board. Alternatively, a plurality of boards may share a same memory and a same processor. In addition, a necessary circuit may further be disposed on each board. The DU 701 may include one or more boards, and a plurality of boards may jointly support a radio access network (for example, a 5G network, or a 6G network) of a single access standard, or may separately support radio access networks (for example, an LTE network, a 5G network, a 6G network, and another network) of different access standards. The memory 708 and the processor 707 may serve one or more boards. In other words, a memory and a processor may be disposed on each board. Alternatively, a plurality of boards may share a same memory and a same processor. In addition, a necessary circuit may further be disposed on each board.

Figure 8:
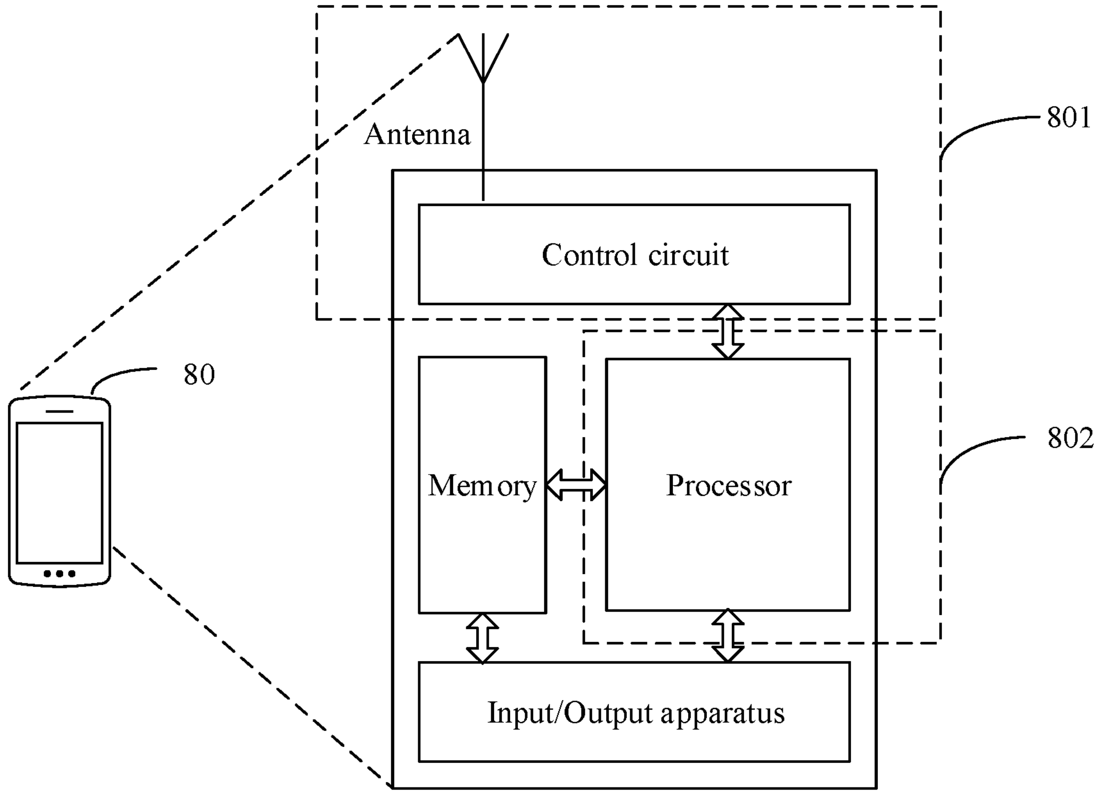
FIG. 8 is a schematic diagram of a structure of a terminal device according to an embodiment of this application.

FIG. 8 is a schematic diagram of a structure of a terminal device according to an embodiment of this application. The terminal device may be applied to the system shown in FIG. 1, and perform a function of the terminal device in the method embodiment shown in FIG. 2. For ease of description, FIG. 8 shows only main components of the terminal device. As shown in FIG. 8, the terminal device 80 includes a processor, a memory, a control circuit, an antenna, and an input/output apparatus. The processor is mainly configured to: process a communication protocol and communication data, control the entire terminal device, execute a software program, and process data of the software program, for example, configured to support the terminal device in performing actions described in the method embodiments in FIG. 3 and FIG. 4. The memory is mainly configured to store the software program and data. The control circuit is mainly configured to: convert a baseband signal and a radio frequency signal, and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the terminal device is powered on, the processor may read the software program in the memory, explain and execute instructions of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal to the outside in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

In an optional implementation, the terminal device may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 8. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to enhance processing capabilities of the terminal device, and various components of the terminal device may be connected through various buses. The baseband processor may also be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program to implement a baseband processing function.

In this embodiment of this application, the antenna having a transceiver function and the control circuit may be considered as a transceiver unit 801 of the terminal device 80, for example, configured to support the terminal device in performing a receiving function and a sending function. A processor 802 having a processing function is considered as a processing unit 802 of the terminal device 80. As shown in FIG. 8, the terminal device 80 includes the transceiver unit 801 and the processing unit 802. The transceiver unit may alternatively be referred to as a transceiver, a transceiver machine, a transceiver apparatus, or the like. Optionally, a component configured to implement a receiving function in the transceiver unit 801 may be considered as a receiving unit. A component configured to implement a sending function in the transceiver unit 801 may be considered as a sending unit. In other words, the transceiver unit 801 includes the receiving unit and the sending unit. The receiving unit may also be referred to as a receiver machine, an input port, a receiving circuit, or the like. The sending unit may be referred to as a transmitter machine, a transmitter, a transmitting circuit, or the like.

The processor 802 may be configured to execute instructions stored in the memory, to control the transceiver unit 801 to receive a signal and/or send a signal, to complete the function of the terminal device in the method embodiments. The processor 802 further includes an interface, configured to implement a signal input/output function. In an implementation, a function of the transceiver unit 801 may be implemented through a transceiver circuit or a transceiver-dedicated chip.

An embodiment of the present disclosure further provides a computer-readable storage medium, configured to store computer software instructions that need to be executed by the foregoing processor, and the computer-readable storage medium includes a program that needs to be executed by the foregoing processor.

An embodiment of this application further provides a communication system. The communication system includes a communication apparatus configured to implement a function of the terminal device in the embodiment in FIG. 2 and a communication apparatus configured to implement a function of the network device in the embodiment in FIG. 2.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

What is claimed is:

1. A communication method, comprising:

sending configuration information of a first initial uplink bandwidth part (BWP) to a first terminal device of a first type;

sending configuration information of a second initial uplink BWP to a second terminal device of a second type different from the first type; and sending first information to at least one of the first terminal device or the second terminal device, wherein a first frequency domain resource indicated by the first information is in a frequency domain range of the first initial uplink BWP and is used by the first terminal device for third message (Msg3) transmission, wherein a second frequency domain resource indicated by the first information is in a frequency domain range of the second initial uplink BWP and is used by the second terminal device for Msg3 transmission; wherein the second frequency domain resource has a start location determined based on a start location of the first initial uplink BWP; or the second frequency domain resource has a start location determined based on a start location of the second initial uplink BWP and a first offset value, and the first offset value is a frequency domain offset value between the start location of the first initial uplink BWP and the start location of the second initial uplink BWP.

2. The method of claim 1, wherein the first information comprises a resource indication value (RIV) of a frequency domain resource.

3. The method of claim 1, the method further comprising at least one of:

after sending the first information to the first terminal device, receiving a first Msg3 from the first terminal device on the first frequency domain resource; or after sending the first information to the second terminal device, receiving a second Msg3 from the second terminal device on the second frequency domain resource.

4. The method of claim 1, the method further comprising:

for the second terminal device, determining the first information based on a start location and a length of the second frequency domain resource and the first initial uplink BWP; or for the first terminal device, determining the first information based on a start location and a length of the first frequency domain resource and the second initial uplink BWP.

5. The method of claim 1, wherein a frequency domain range of the first frequency domain resource is the same as a frequency domain range of the second frequency domain resource.

6. The method of claim 1, wherein a frequency domain range of the first frequency domain resource is different from a frequency domain range of the second frequency domain resource, and the start location of the first initial uplink BWP is the same as the start location of the second initial uplink BWP.

7. The method of claim 1, wherein the first frequency domain resource and/or the second frequency domain resource belong/belongs to a first frequency domain resource set, and a resource indication value (RIV) of any frequency domain resource in the first frequency domain resource set for the first terminal device is the same as a RIV of any frequency domain resource for the second terminal device.

8. The method according to claim 1, wherein the first information is carried in a random access response uplink grant (RAR UL) grant or downlink control information (DCI) scrambled by using a temporary cell radio network temporary identifier (TC-RNTI).

9. A communication method, applicable to a first terminal device or a chip in the first terminal device, and the method comprising:

receiving configuration information of a first initial uplink bandwidth part (BWP) of the first terminal device from a network device;

receiving first information from the network device, wherein the first information indicates a first frequency domain resource for sending a third message (Msg3) in a random access procedure, wherein the first frequency domain resource is in a frequency domain range of the first initial uplink BWP; and determining the first frequency domain resource based on the first information and a second initial uplink BWP of a second terminal device, wherein the determining the first frequency domain resource based on the first information and the second initial uplink BWP comprises:

determining a start location of the first frequency domain resource and a length of the first frequency domain resource based on the first information, the first initial uplink BWP, and a first offset value, wherein the first offset value is a frequency domain offset value between a start location of the first initial uplink BWP and a start location of the second initial uplink BWP.

10. The method of claim 9, wherein the first frequency domain resource is in a frequency domain range of the second initial uplink BWP.

11. The method of claim 9, wherein the first information comprises a resource indication value (RIV) of a frequency domain resource.

12. The method of claim 9, wherein the first information is carried in a random access response uplink grant (RAR UL) grant or downlink control information (DCI) scrambled by using a temporary cell radio network temporary identifier (TC-RNTI).

13. An apparatus, comprising:

one or more processors; and one or more non-transitory memories coupled to the one or more processors and storing programming instructions that, when executed by the one or more processors, cause the apparatus to perform:

receiving configuration information of a first initial uplink bandwidth part (BWP) of the first terminal device from a network device;

receiving first information from the network device, wherein the first information indicates a first frequency domain resource for sending a third message (Msg3) in a random access procedure, wherein the first frequency domain resource is in a frequency domain range of the first initial uplink BWP; and determining the first frequency domain resource based on the first information and a second initial uplink BWP of a second terminal device, wherein the determining the first frequency domain resource based on the first information and the second initial uplink BWP comprises:

determining a start location of the first frequency domain resource and a length of the first frequency domain resource based on the first information, the first initial uplink BWP, and a first offset value, wherein the first offset value is a frequency domain offset value between a start location of the first initial uplink BWP and a start location of the second initial uplink BWP.

14. The apparatus of claim 13, wherein the first frequency domain resource is in a frequency domain range of the second initial uplink BWP.

* * * * *